(12) United States Patent
Ogawa et al.

(10) Patent No.: US 11,296,356 B2
(45) Date of Patent: Apr. 5, 2022

(54) POLYMER ELECTROLYTE COMPOSITION INCLUDING POLYMER HAVING A STRUCTURAL UNIT REPRESENTED BY FORMULA (1), ELECTROLYTE SALT, AND MOLTEN SALT, AND POLYMER SECONDARY BATTERY INCLUDING THE SAME

(71) Applicant: HITACHI CHEMICAL COMPANY, LTD., Tokyo (JP)

(72) Inventors: Hideyuki Ogawa, Tokyo (JP); Hiroki Mikuni, Tokyo (JP); Yusuke Sera, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 93 days.

(21) Appl. No.: 16/606,493

(22) PCT Filed: Apr. 21, 2017

(86) PCT No.: PCT/JP2017/016079
§ 371 (c)(1),
(2) Date: Oct. 18, 2019

(87) PCT Pub. No.: WO2018/193627
PCT Pub. Date: Oct. 25, 2018

(65) Prior Publication Data
US 2021/0111430 A1    Apr. 15, 2021

(51) Int. Cl.
*H01M 10/0565* (2010.01)
*C08F 126/04* (2006.01)
(Continued)

(52) U.S. Cl.
CPC ....... *H01M 10/0565* (2013.01); *C08F 126/04* (2013.01); *C08K 5/435* (2013.01);
(Continued)

(58) Field of Classification Search
CPC ... H01M 10/0565; C08F 126/04; C08K 5/435
(Continued)

(56) References Cited

U.S. PATENT DOCUMENTS 6,395,419 B1    5/2002    Kuwahara et al.
2005/0221188 A1    10/2005    Takami et al.
(Continued)

FOREIGN PATENT DOCUMENTS

CN    102522589 A1    6/2012
CN    102754267 A    10/2012
(Continued)

OTHER PUBLICATIONS

Appetecchi et al., Ternary polymer electrolytes containing pyrrolidinium-based polymeric ionic liquids for lithium batteries, Jun. 2010, Journal of Power Sources, 195, 3668-3675 (Year: 2010).*

(Continued)

*Primary Examiner* — Sean P Cullen
(74) *Attorney, Agent, or Firm* — Fitch, Even, Tabin & Flannery, LLP

(57) ABSTRACT

There is disclosed a polymer electrolyte composition that comprises a polymer having a structural unit represented by the following formula (1), at least one electrolyte salt selected from the group consisting of lithium salts, sodium salts, and magnesium salts, and a molten salt having a melting point of 250° C. or less:

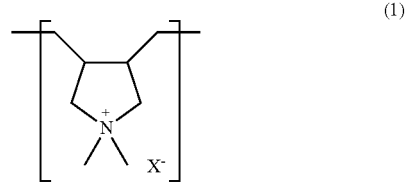

(1)

wherein $X^-$ represents a counter anion.

13 Claims, 5 Drawing Sheets

(51) Int. Cl.
*C08K 5/435* (2006.01)
*H01M 10/0567* (2010.01)
(52) U.S. Cl.
CPC ................. *H01M 10/0567* (2013.01); *H01M 2300/0048* (2013.01); *H01M 2300/0082* (2013.01); *H01M 2300/0091* (2013.01)
(58) Field of Classification Search
USPC ........................................................ 429/310
See application file for complete search history.

(56) References Cited

U.S. PATENT DOCUMENTS

| | | |
|---|---|---|
| 2008/0160324 A1 | 7/2008 | Ohmori et al. |
| 2010/0075222 A1 | 3/2010 | Watanabe |
| 2012/0301794 A1 | 11/2012 | Koh et al. |
| 2013/0106029 A1 | 5/2013 | Snyder et al. |
| 2015/0079485 A1 | 3/2015 | Choi et al. |
| 2015/0155566 A1 | 6/2015 | Kim et al. |
| 2016/0149224 A1 | 5/2016 | Okuno |
| 2016/0181658 A1 | 6/2016 | Kim et al. |
| 2017/0018802 A1 | 1/2017 | Omoda et al. |
| 2018/0277897 A1 | 9/2018 | Sugita et al. |
| 2021/0111430 A1 | 4/2021 | Ogawa et al. |
| 2021/0135275 A1 | 5/2021 | Ogawa et al. |

FOREIGN PATENT DOCUMENTS

| | | |
|---|---|---|
| CN | 110537274 A | 12/2019 |
| EP | 1619742 A | 1/2006 |
| EP | 2415793 A1 | 2/2012 |
| EP | 3279973 A1 | 2/2018 |
| JP | H11-162513 A | 6/1999 |
| JP | 2000-090728 A | 3/2000 |
| JP | 2000-164254 A | 6/2000 |
| JP | 2003-077539 A | 3/2003 |
| JP | 2006-032237 A | 2/2006 |
| JP | 2006-049158 A | 2/2006 |
| JP | 2006-120517 A | 5/2006 |
| JP | 2006-294326 A | 10/2006 |
| JP | 2007-141467 A | 6/2007 |
| JP | 2008-053135 A | 3/2008 |
| JP | 2008-243736 A | 10/2008 |
| JP | 2010-153375 A | 7/2010 |
| JP | 2011-054519 | 3/2011 |
| JP | 2011-070793 A | 4/2011 |
| JP | 2011-108499 A | 6/2011 |
| JP | 2011-129400 A | 6/2011 |
| JP | 2012-518248 A | 8/2012 |
| JP | 2013-019154 A | 1/2013 |
| JP | 2013-191547 A | 9/2013 |
| JP | 2013-214510 A | 10/2013 |
| WO | 99/040025 A1 | 8/1999 |
| WO | 2011/037060 A1 | 3/2011 |
| WO | 2015/068324 A1 | 5/2015 |
| WO | 2015/097952 A1 | 7/2015 |
| WO | 2017/047015 A1 | 3/2017 |

OTHER PUBLICATIONS

Li et al., Polymeric ionic liquid-ionic plastic crystal all-solid-state electrolytes for wide operating temperature range lithium metal batteries, Sep. 2017, Journal of Materials Chemistry A, 5, 21362-21369 (Year: 2017).*
Brinkkötter et al., Influence of anion structure on ion dynamics in polymer gel electrolytes composed of poly(ionic liquid), ionic liquid and Li salt, May 2017, Electrochimica Acta, 237, 237-247 (Year: 2017).*
Pont et al., Pyrrolidinium-based polymeric ionic liquids as mechanically and electrochemically stable polymer electrolytes, May 2009, Journal of Power Sources, 188, 558-563 (Year: 2009).*
Safa et al., Polymeric Ionic Liquid Gel Electrolyte for Room Temperature Lithium Battery Applications, Sep. 2016, Electrochimica Acta, 213, 587-593 (Year: 2016).*
Yoshizawa-Fujita et al., A Plastic Electrolyte Material in a Highly Desirable Temperature Range: N-Ethyl-N-methylpyrrolidinium Bis(fluorosulfonyl)amide, 2014, Chemistry Letters, 43, 1909-1911 (Year: 2014).*
Bhandary Rajesh et al, "Polymer effect on lithium ion dynamics in gel polymer electrolytes: Cationic versus acrylate polymer", Electrochimica Acta, Elsevier, Amsterdam, NL, vol. 174, Jun. 11, 2015, p. 753-p. 761, XP029250951 (cited in a Search Report in counterpart EP Patent Application No. 17906396.1 dated Oct. 28, 2020).
Kaiya Koji, "High School Course TV Learning Memo: Molecular Polarity", online, NHK accessed on Feb. 14, 2020 https://www.nhk.or.jp/kokokoza/library/tv/kagakukisol , Oct. 2019 (cited in an office action in counterpart JP Patent Application No. P2019-510989 dated Feb. 20, 2020).
Oeda Kazunari, "Properties of Teflon® Fluorine Resin", online,Packing Land Co., Ltd. accessed on Feb. 14, 2020 URL: https://www.packing.co.jp/PTFE/ptfe_tokusei1.htm, Oct. 2006 (cited in an office action in counterpart JP Patent Application No. P2019-510989 dated Feb. 20, 2020).
G.B. .Appetecchi et al., "Ternary polymer electrolytes containing pyrrolidinium-based polymeric ionicliquids for lithium batteries", Joumal of Power Sources vol. 195(11), 2010, p. 3668-p. 3675 (cited in ISRs of Appln. No. PCT/JP2018/016318 dated Jun. 12, 2018 and PCT/JP2017/016079 dated Jul. 4, 2017).
Anne-Laure Pont et al., "Pyrrolidinium-based polymeric ionic liquids as mechanically andelectrochemicaily stable polymer electrolytes", Journal of Power Souices vol. 188 (2), 2009, p. 558-p. 563 (cited in ISRs of Appln. No. PCT/JP2018/016318 dated Jun. 12, 2018 and PCT/JP2017/016079 dated Jul. 4, 2017, and in specification of copending U.S. Appl. No. 16/606,273).
P. Hovington et al., "New Lithium Metal Polymer Solid State Battery for an Ultrahigh Energy: Nano C—LiFePO4 versus Nano Li1.2V3O8", Nano Letters, 2015,15(4), p. 2671-p. 2678 (cited in specification).
Ruisi Zhang et al., "Ionic Liquid-Doped Gel Polymer Electrolyte for Flexible Lithium-Ion Polymer Batteries", 2015 (cited in a office action dated Nov. 24, 2021 in U.S. Appl. No. 16/617,048).

* cited by examiner

*Fig.4*
(a)
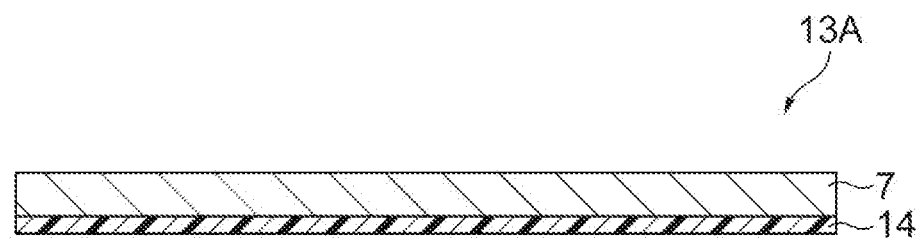
(b)
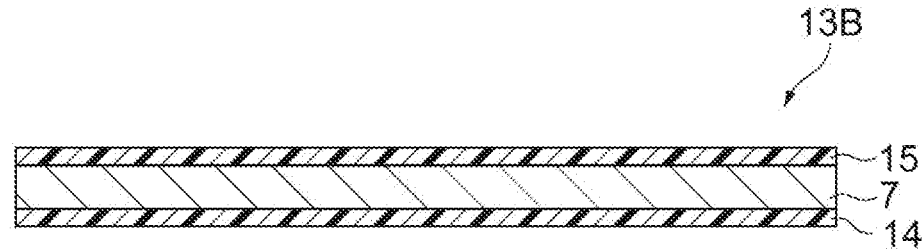

POLYMER ELECTROLYTE COMPOSITION INCLUDING POLYMER HAVING A STRUCTURAL UNIT REPRESENTED BY FORMULA (1), ELECTROLYTE SALT, AND MOLTEN SALT, AND POLYMER SECONDARY BATTERY INCLUDING THE SAME

CROSS-REFERENCE TO RELATED APPLICATIONS

This application is a U.S. national phase application filed under 35 U.S.C. § 371 of International Application No. PCT/JP2017/016079, filed Apr. 21, 2017, which is hereby incorporated herein by reference in its entirety.

TECHNICAL FIELD

The present invention relates to polymer electrolyte compositions and polymer secondary batteries.

BACKGROUND ART

Lithium secondary batteries are energy devices having a high energy density and are spread as power sources for mobile electronic devices and electric vehicles. For example, in a 18650-type lithium secondary battery, a wound electrode body is accommodated inside a cylindrical battery can. The wound electrode body is configured such that a microporous separator is sandwiched between a positive electrode and a negative electrode and these are wound around in a swirl, and the separator is immersed in a flammable liquid electrolyte. In such a lithium secondary battery, if the temperature of the battery abruptly rises in an emergency, there is a possibility that the liquid electrolyte vaporizes and the inner pressure rises to thereby lead to a burst. If the temperature of the battery abruptly rises, there is also a possibility that the liquid electrolyte fires.

It is important to prevent situations in which a lithium secondary battery ignites or fires in design of lithium secondary batteries. In lithium secondary batteries, it is required that the safety be further improved with the aim of achieving a higher energy density and enlargement.

As a fundamental solution to improve the safety of lithium secondary batteries, development of all-solid-state batteries, in which the liquid electrolyte is replaced with a polymer electrolyte or inorganic solid electrolyte and all the components are of solid, has proceeded. Particularly, polymer electrolytes, which can be easily formed into a sheet by applying a polymer solution, have been intensively investigated.

A material widely investigated for polymer electrolytes is polyethylene oxide (PEO). PEO shows a high ionic conductivity of more than $1 \times 10^{-4}$ S/cm at 60° C. and has a track record of commercialization, in part, for automobile use (see, e.g., Patent Literature 1 and Non Patent Literature 1).

In order to improve the ionic conductivity, investigations are actively conducted on non-aqueous solvents to be combined with polymer electrolytes. As such non-aqueous solvents, from the viewpoint of ionic conductivity, organic solvents such as dialkyl carbonate are widely used (see, e.g., Patent Literature 2).

CITATION LIST

Patent Literature

Patent Literature 1: JP No. 2006-294326
Patent Literature 2: JP No. 2007-141467

Non Patent Literature

Non Patent Literature 1: P. Hovington et. al., Nano Lett. 2015, 15, 2671-2678

SUMMARY OF INVENTION

Technical Problem

The polymer electrolyte employing PEO described in Patent Literature 1, however, has not been widely commercialized due to reasons such as its low oxidative stability and a marked reduction in the ionic conductivity at temperatures lower than room temperature.

Alternatively, the polymer electrolyte combined with an organic solvent described in Patent Literature 2 shows a high ionic conductivity but there is a safety concern. Moreover, since an organic solvent is easily vaporize, when the electrolyte is formed into a sheet form, its handling is hard, and removal of moisture by drying, which is essential for improving the characteristics of batteries, is difficult. Furthermore, depending on the type of polymer electrolyte and organic solvent, the polymer electrolyte and the organic solvent become separate, and there is a concern that the ionic conductivity and mechanical strength of the polymer electrolyte sheet are markedly reduced.

The present invention has been made in consideration of the situation described above, and it is a major object to provide a polymer electrolyte composition that makes it possible to produce a sheet that has an excellent ionic conductivity at room temperature (e.g., 25° C.) even without use of an organic solvent and a high self-supportability.

Solution to Problem

A first aspect of the present invention is a polymer electrolyte composition comprising a polymer having a structural unit represented by the following formula (1), at least one electrolyte salt selected from the group consisting of lithium salts, sodium salts, magnesium salts, and calcium salts, and a molten salt having a melting point of 250° C. or less:

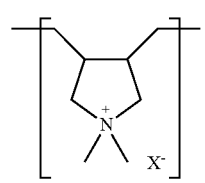

(1)

wherein $X^-$ represents a counter anion.

With the polymer electrolyte composition according to the first aspect of the present invention, it is possible to produce a sheet that has an excellent ionic conductivity at room temperature even without use of an organic solvent and a high self-supportability. A molten salt does not substantially vaporize in a drying process (e.g., drying at 60° C.

under reduced pressure of $1.0 \times 10^4$ Pa or less (0.1 atmospheres or less) for 10 hours or more), and thus, the polymer electrolyte composition may become a highly thermal-stable material.

The molten salt may be at least one selected from the group consisting of 1-ethyl-3-methylimidazolium-bis(trifluoromethanesulfonyl)imide, N,N-diethyl-N-methyl-N-(2-methoxyethyl)ammonium-bis(trifluoromethanesulfonyl)imide, and N-ethyl-N-methylpyrrolidinium-bis(trifluoromethanesulfonyl)imide.

The content of the molten salt may be 10 to 70% by mass based on the total amount of the composition. When the content of the molten salt is in such a range, it is further possible to produce a sheet that has an excellent ionic conductivity at room temperature and a high self-supportability.

The anion of the electrolyte salt may be at least one selected from the group consisting of $PF_6^-$, $BF_4^-$, $N(FSO_2)_2^-$, $N(CF_3SO_2)_2^-$, $B(C_2O_4)_2^-$, and $ClO_4^-$.

The electrolyte salt may be a lithium salt.

The polymer electrolyte composition may be formed into a sheet form. Sheets formed by employing the polymer electrolyte composition may become sheets that can retain their shape even without a substrate or the like. It should be noted herein that the polymer electrolyte composition formed into a sheet form may be referred to as "a polymer electrolyte sheet".

The present invention may further relate to application of the aforementioned composition as a polymer electrolyte and to application of the aforementioned composition for producing a polymer electrolyte.

A second aspect of the present invention is a polymer secondary battery that comprises a positive electrode, a negative electrode, and an electrolyte layer comprising the aforementioned polymer electrolyte composition placed between the positive electrode and the negative electrode.

Advantageous Effects of Invention

According to the present invention, there is provided a polymer electrolyte composition that makes it possible to produce a sheet that has an excellent ionic conductivity at room temperature even without use of an organic solvent and a high self-supportability. According to the present invention, there is also provided a polymer secondary battery employing such a polymer electrolyte composition.

BRIEF DESCRIPTION OF DRAWINGS

FIG. 4(a) is a schematic cross sectional view showing a polymer electrolyte sheet according to one embodiment;

FIG. 4(b) is a schematic cross sectional view showing a polymer electrolyte sheet according to another embodiment.

DESCRIPTION OF EMBODIMENTS

Hereinbelow, embodiments of the present invention will be described with reference to the drawings. However, the present invention is not intended to be limited to the following embodiments. In the following embodiments, their components (including steps) are not essential unless otherwise explicitly stated. Dimensions of the components in each drawing are imaginary, and the relative relationship of the dimension between the components is not limited to those shown in each drawing.

The same shall apply to numerical values and numerical ranges herein, which do not limit the present invention. Each numerical range specified using "to" herein represents a range including the numerical values indicated before and after "to" as the minimum value and the maximum value, respectively. In the numerical ranges described stepwise herein, the upper limit or lower limit described in one numerical range may be replaced by the upper limit or lower limit of another numerical range described stepwise. Also in the numerical ranges described herein, the upper limit or lower limit of the numerical ranges may be replaced by a value shown in Examples.

Herein, as abbreviations, the following may be used.

Figure 1:
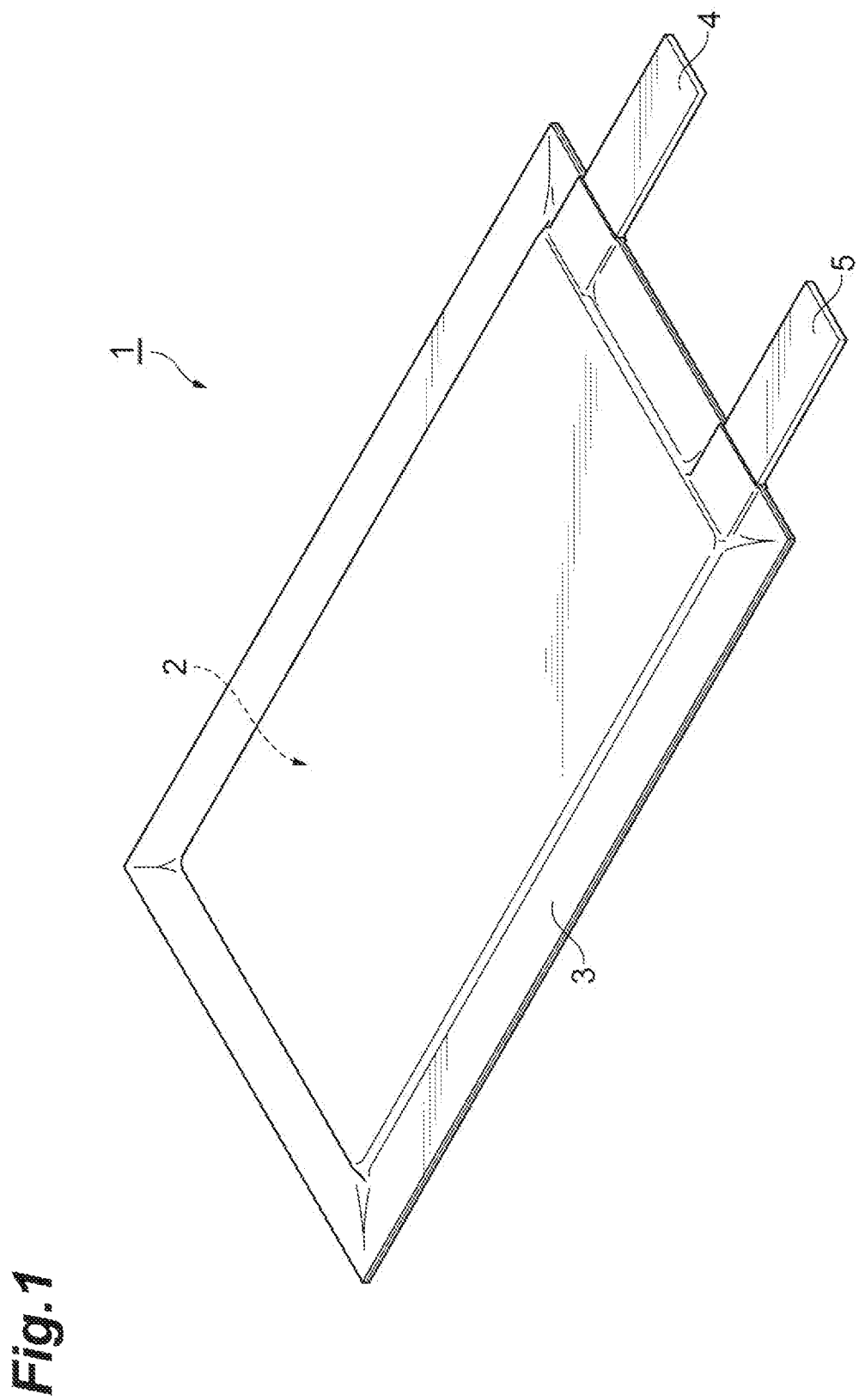
FIG. 1 is a perspective view showing a polymer secondary battery according to First Embodiment.

[EMI]$^+$: 1-ethyl-3-methylimidazolium cation
[DEME]$^+$: N,N-diethyl-N-methyl-N-(2-methoxyethyl)ammonium cation
[Py12]$^+$: N-ethyl-N-methylpyrrolidinium cation
[Py13]$^+$: N-methyl-N-propylpyrrolidinium cation
[PP13]$^+$: N-methyl-N-propylpiperidinium cation
[FSI]$^-$: bis(fluorosulfonyl)imide anion
[TFSI]$^-$: bis(trifluoromethanesulfonyl)imide anion
[f3C]$^-$: tris(fluorosulfonyl)carbanion
[BOB]$^-$: bis oxalate borate anion
[P(DADMA)][Cl]: poly(diallyldimethylammonium)chloride
[P(DADMA)][TFSI]: poly(diallyldimethylammonium)bis(trifluoromethanesulfonyl)imide First Embodiment FIG. 1 is a perspective view showing a polymer secondary battery according to First Embodiment. As shown in FIG. 1, a polymer secondary battery 1 comprises an electrode group 2 composed of a positive electrode, a negative electrode, and an electrolyte layer, and a bag-like battery outer packaging 3 to accommodate the electrode group 2. A positive electrode collector tab 4 on the positive electrode and a negative electrode collector tab 5 on the negative electrode are provided respectively. The positive electrode collector tab 4 and the negative electrode collector tab 5 protrude from the inside of the battery outer packaging 3 to the outside such that the positive electrode and the negative electrode can each electrically connect to the outside of the polymer secondary battery 1.

The battery outer packaging 3 may be formed with a laminate film, for example. The laminate film may be a layered film in which, for example, a resin film such as a polyethylene terephthalate (PET) film, a foil of metal such as aluminum, copper, and stainless steel, and a sealant layer such as polypropylene are layered in this order.

Figure 2:
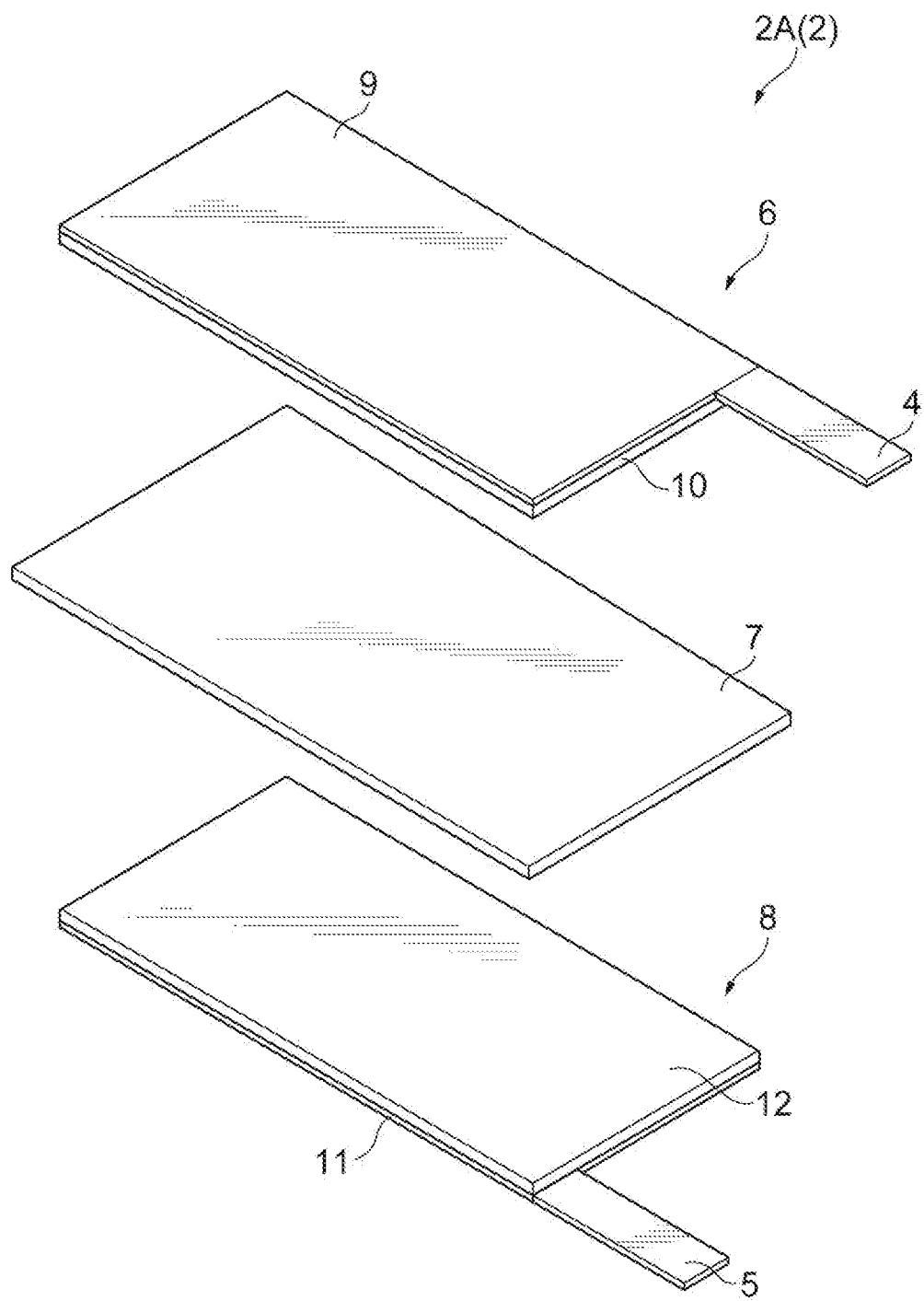
FIG. 2 is an exploded perspective view showing one embodiment of an electrode group in the polymer secondary battery shown in FIG. 1.
Figure 3:
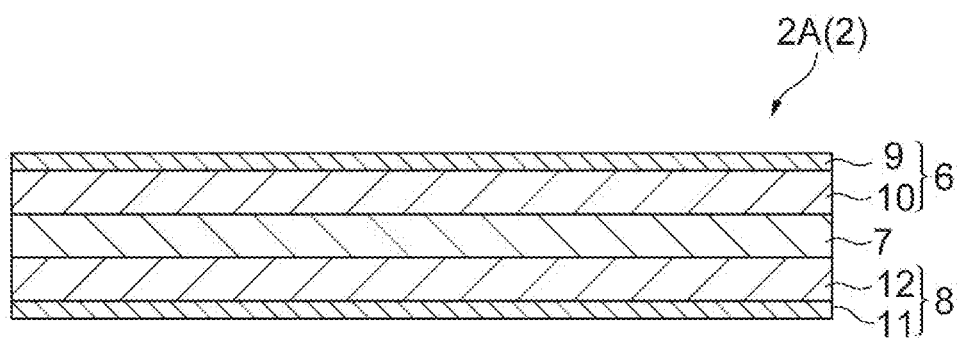
FIG. 3 is a schematic cross sectional view showing one embodiment of the electrode group in the polymer secondary battery shown in FIG. 1.

FIG. 2 is an exploded perspective view showing one embodiment of the electrode group 2 in the polymer secondary battery 1 shown in FIG. 1. FIG. 3 is a schematic cross sectional view showing one embodiment of the electrode group 2 in the polymer secondary battery 1 shown in FIG. 1. As shown in FIG. 2 and FIG. 3, an electrode group 2A according to the present embodiment comprises a positive electrode 6, an electrolyte layer 7, and a negative electrode 8 in this order. The positive electrode 6 comprises a positive electrode current collector 9 and a positive electrode mixture layer 10 provided on the positive electrode current collector 9. On the positive electrode current collector 9, the positive electrode collector tab 4 is provided. The negative electrode 8 comprises a negative electrode current collector 11 and a negative electrode mixture layer 12 provided on the negative electrode current collector 11. On the negative electrode current collector 11, the negative electrode collector tab 5 is provided.

The positive electrode current collector 9 may be formed with aluminum, stainless steel, titanium or the like. The positive electrode current collector 9 may be specifically an aluminum perforated foil having pores of which pore diameter is 0.1 to 10 mm, an expanded metal, a foamed metal sheet or the like. The positive electrode current collector 9 may be formed with any material other than those described above as long as the material is not subject to change such as dissolution and oxidation during use of the battery, and additionally, its shape and production method are not limited.

The thickness of the positive electrode current collector 9 may be 1 µm or more, 5 µm or more, or 10 µm or more. The thickness of the positive electrode current collector 9 may be 100 µm or less, 50 µm or less, or 20 µm or less.

The positive electrode mixture layer 10, in one embodiment, comprises a positive electrode active material, a conductive agent, and a binder.

The positive electrode active material may be $LiCoO_2$, $Li_{0.3}MnO_2$, $Li_4Mn_5O_2$, $V_2O_5$, $LiMn_2O_4$, $LiNiO_2$, $LiFePO_4$, $LiCo_{1/3}Ni_{1/3}Mn_{1/3}O_2$, $Li_{1.2}(Fe_{0.5}Mn_{0.5})_{0.7}O_2$, $Li_{1.2}(Fe_{0.4}Mn_{0.4}Ti_{0.2})_{0.8}O_2$, $Li_{1+x}(Ni_{0.5}Mn_{0.5})_{1-x}O_2$ (provided that x=0 to 1), $LiNi_{0.5}Mn_{1.5}O_4$, $Li_2MnO_3$, $Li_{0.76}Mn_{0.5}1Ti_{0.49}O_2$, $LiNi_{0.8}Co_{0.15}Al_{0.05}O_2$, $Fe_2O_3$, $LiCoPO_4$, $LiMnPO_4$, $Li_2MPO_4F$ (M=Fe, Mn), $LiMn_{0.875}Fe_{0.125}PO_4$, $Li_2FeSiO_4$, $Li_{2-x}MSi_{1-x}P_xO_4$ (M=Fe, Mn) (provided that x=0 to 1), $LiMBO_3$ (M=Fe, Mn), $FeF_3$, $Li_3FeF_6$, $Li_2TiF_6$, $Li_2FeS_2$, $TiS_2$, $MoS_2$, FeS and the like.

The positive electrode active material may be ungranulated primary particles or granulated secondary particles.

The particle size of the positive electrode active material is adjusted to be equal to or smaller than the thickness of the positive electrode mixture layer 10. In the case where coarse particles having a particle size equal to or larger than the thickness of positive electrode mixture layer 10 are present in the positive electrode active material, the coarse particles are removed by sieve classification, wind flow classification, or the like in advance to select positive electrode active material having a particle size equal to or smaller than the thickness of the thickness of the positive electrode mixture layer 10.

The average particle size of the positive electrode active material is preferably 1 µm or more, more preferably 3 µm or more, still more preferably 5 µm or more and preferably 30 µm or less, more preferably 25 µm or less, still more preferably 20 µm or less, from the viewpoint of suppressing reduction in filling of the positive electrode active material due to decrease in the particle size as well as of enhancing the electrolyte retention capability. The average particle size of the positive electrode active material is the particle size ($D_{50}$) when the ratio based on the total volume of the positive electrode active material (volume fraction) is 50%. The average particle size of the positive electrode active material ($D_{50}$) is obtained by measuring a suspension, prepared by suspending the positive electrode active material in water, by the laser scattering method using a laser scattering type particle size measuring apparatus (e.g., Microtrac).

The content of the positive electrode active material may be 80% by mass or more, 85% by mass or more, or 90% by mass or more based on the total amount of the positive electrode active material, the conductive agent, and the binder. The content of the positive electrode active material may be, for example, 99% by mass or less based on the total amount of the positive electrode active material, the conductive agent, and the binder.

The conductive agent may be carbon black, graphite, carbon fiber, carbon nanotubes, acetylene black, or the like.

The content of the conductive agent may be 1% by mass or more, 3% by mass or more, or 5% by mass or more based on the total amount of the positive electrode active material, the conductive agent, and the binder. The content of the conductive agent is preferably 15% by mass or less, more preferably 12% by mass or less, still more preferably 9% by mass or less based on the total amount of the positive electrode active material, the conductive agent, and the binder, from the viewpoint of suppressing increase in the volume of the positive electrode 6 and reduction in the energy density of the polymer secondary battery 1 associated with the increase.

The binder is not particularly limited as long as the binder does not decompose on the surface of the positive electrode 6, and is a polymer, for example. Examples of the binder may include resins such as polyvinylidene fluoride, polyacrylonitrile, styrene-butadiene rubber, carboxymethyl cellulose, fluorine rubber, ethylene-propylene rubber, polyacrylic acid, polyimide, and polyamide; and copolymer resins having these resins as the main skeleton (e.g., polyvinylidene fluoride-hexafluoropropylene copolymer).

The content of the binder may be 1% by mass or more, 3% by mass or more, or 5% by mass or more based on the total amount of the positive electrode active material, the conductive agent, and the binder. The content of the binder may be 15% by mass or less, 12% by mass or less, or 9% by mass or less based on the total amount of the positive electrode active material, the conductive agent, and the binder.

The positive electrode mixture layer 10 may further comprise a plastic crystal, a molten salt such as an ionic liquid, and the like, as required. Examples of the molten salt can include ones similar to molten salts having a melting point of 250° C. or less, mentioned below. The content of the molten salt may be 0.01 to 20% by mass based on the total amount of the positive electrode mixture layer.

The thickness of the positive electrode mixture layer 10 is a thickness equal to or larger than the average particle size of the positive electrode active material from the viewpoint of further increasing the electrical conductivity, and is preferably 10 µm or more, more preferably 20 µm or more, still more preferably 30 µm or more. The thickness of the positive electrode mixture layer 10 is preferably 100 µm or less, more preferably 80 µm or less, still more preferably 60 µm or less. By setting the thickness of the positive electrode mixture layer to 100 µm or less, it is possible to suppress an imbalance of charge and discharge caused by variation of the charged level of the positive electrode active material in the proximity of the surface of the positive electrode mixture layer 10 and in the proximity of the surface of the positive electrode current collector 9.

The mixture density of the positive electrode mixture layer 10 is preferably 1 g/cm³ or more from the viewpoint of bringing the conductive agent and the positive electrode active material into close contact to each other to thereby reduce the electronic resistance of the positive electrode mixture layer 10.

The negative electrode current collector 11 may be formed with copper, stainless steel, titanium, nickel or the like. The negative electrode current collector 11 may be specifically a rolled copper foil, for example, a perforated copper foil having a pore diameter of 0.1 to 10 mm, an expanded metal, a foamed metal sheet or the like. The negative electrode current collector 11 may be formed with any material other than those described above, and additionally, its shape and production method are not limited.

The thickness of the negative electrode current collector 11 may be 1 μm or more, 5 μm or more, or 10 μm or more. The thickness of the negative electrode current collector 11 is 100 μm or less, 50 μm or less, or 20 μm or less.

The negative electrode mixture layer 12, in one embodiment, comprises a negative electrode active material and a binder.

As the negative electrode active material, ones used as a negative electrode active material in the field of common energy devices such as secondary batteries can be used. Examples of the negative electrode active material include metal lithium, lithium alloys, metal compounds, carbon materials, metal complexes, and organic polymer compounds. These may be used singly or two or more of these may be used in combination. Of these, it is preferred that the negative electrode active material be a carbon material. Examples of the carbon material include graphite such as natural graphite (such as scale-like graphite) and artificial graphite, carbon black such as acetylene black, Ketjen black, channel black, furnace black, lamp black, and thermal black, amorphous carbon, and carbon fibers.

The average particle size of the negative electrode active material ($D_{50}$) is preferably 1 μm or more, more preferably 3 μm or more, still more preferably 5 μm or more and preferably 20 μm or less, more preferably 18 μm or less, still more preferably 16 μm or less from the viewpoint of suppressing increase in the irreversible capacity due to reduction in the particle size as well as of obtaining a well-balanced negative electrode 8 of which electrolyte retention capability is enhanced. The average particle size of the negative electrode active material ($D_{50}$) is measured by the same method as for the average particle size of the positive electrode active material ($D_{50}$).

The content of the negative electrode active material may be the same as the content of positive electrode active material in the positive electrode mixture layer 10 mentioned above.

The binder and its content may be similar to the binder and its content in the positive electrode mixture layer 10 aforementioned.

The negative electrode mixture layer 12 may further comprise a conductive agent from the viewpoint of further reducing the resistance of the negative electrode 8. The conductive agent and its content may be similar to the conductive agent and its content in the positive electrode mixture layer 10 aforementioned.

The negative electrode mixture layer 12 may further comprise a plastic crystal, a molten salt such as an ionic liquid, and the like, as required. Examples of the molten salt can include ones similar to molten salts having a melting point of 250° C. or less, mentioned below. The content of the molten salt may be 0.01 to 20% by mass based on the total amount of the negative electrode mixture layer.

The thickness of the negative electrode mixture layer 12 is equal to or larger than the average particle size of the negative electrode active material from the viewpoint of further increasing the electrical conductivity, and is preferably 10 μm or more, more preferably 15 μm or more, still more preferably 20 μm or more. The thickness of the negative electrode mixture layer 12 is preferably 50 μm or less, more preferably 45 μm or less, still more preferably 40 μm or less. By setting the thickness of the negative electrode mixture layer 12 to 50 μm or less, it is possible to suppress an imbalance of charge and discharge caused by variation of the charged level of the positive electrode active material in the proximity of the surface of the negative electrode mixture layer 12 and in the proximity of the surface of the negative electrode current collector 11.

The mixture density of the negative electrode mixture layer 12 is preferably 1 g/cm³ or more from the viewpoint of bringing the conductive agent and the negative electrode active material into close contact to each other to thereby reduce the electronic resistance of the negative electrode mixture layer 12.

It is possible to form the electrolyte layer 7 from a polymer electrolyte composition. The polymer electrolyte composition comprises a polymer having a specific structural unit, a specific electrolyte salt, and a specific molten salt.

[Polymer]

The polymer electrolyte composition comprises a polymer having a structural unit represented by the following formula (1):

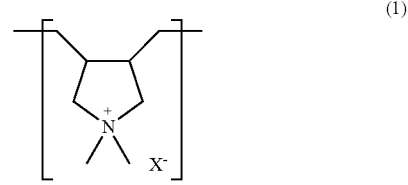

In the formula (1), $X^-$ represents a counter anion. Examples of $X^-$ herein include $BF_4^-$ (tetrafluoroborate anion), $PF_6^-$ (hexafluorophosphate anion), $N(FSO_2)_2^-$ (bis(fluorosulfonyl)imide anion, [FSI]$^-$), $N(CF_3SO_2)_2^-$ (bis(trifluoromethanesulfonyl)imide anion, [TFSI]$^-$), $C(SO_2F)_3^-$ (tris(fluorosulfonyl)carbanion, [f3C]$^-$), $B(C_2O_4)_2^-$ (bisoxalatoborate anion, [BOB]$^-$), $BF_3(CF_3)^-$, $BF_3(C_2F_5)^-$, $BF_3(C_3F_7)^-$, $BF_3(C_4F_9)^-$, $C(SO_2CF_3)_3^-$, $CF_3SO_2O^-$, $CF_3COO^-$, and $RCOO^-$ (R is an alkyl group having 1 to 4 carbon atoms, a phenyl group, or a naphthyl group). Of these, $X^-$ is preferably at least one selected from the group consisting of $BF_4^-$, $PF_6^-$, [FSI]$^-$, [TFSI]$^-$, and [f3C]$^-$, more preferably [TFSI]$^-$ or [FSI]$^-$.

The viscosity average molecular weight Mv (g·mol$^{-1}$) of the polymer having a structural unit represented by the formula (1) is not particularly limited, and preferably $1.0 \times 10^5$ or more, more preferably $3.0 \times 10^5$ or more. Also, the viscosity average molecular weight of the polymer is preferably $5.0 \times 10^6$ or less, more preferably $1.0 \times 10^6$. When the viscosity average molecular weight is $1.0 \times 10^5$ or more, the self-supportability of the polymer electrolyte tends to be more excellent. Additionally, when the viscosity average molecular weight is $5.0 \times 10^6$ or less, the handling ability of forming by application tends to be higher.

In the present description, the "viscosity average molecular weight" can be evaluated by viscometry, which is a general measuring method, and can be calculated from, for example, an intrinsic-viscosity number [η] measured based on JISK7367-3:1999.

It is preferred that the polymer having a structural unit represented by the formula (1) be a polymer composed only of the structural unit represented by the formula (1), that is a homopolymer, from the viewpoint of ionic conductivity.

The polymer having a structural unit represented by the formula (1) may be a polymer represented by the following formula (2).

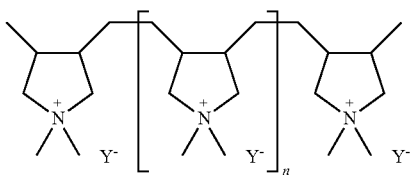

(2)

In the formula (1), n is 300 to 4000, and Y⁻ represents a counter anion. As Y⁻, it is possible to use one similar to those exemplified for X⁻.

n is 300 or more, preferably 400 or more, more preferably 500 or more. n is also 4000 or less, preferably 3500 or less, more preferably 3000 or less. n is also 300 to 4000, preferably 400 to 3500, more preferably 500 to 3000. When n is 300 or more, the self-supportability of the polymer electrolyte sheet tends to be more excellent. When n is 4000 or less, the ionic conductivity of the polymer electrolyte sheet tends to be further increased.

The method for producing a polymer having a structural unit represented by the formula (1) is not particularly limited, and it is possible to use, for example, the method for production described in Journal of Power Sources 2009, 188, 558-563.

The polymer having a structural unit represented by the formula (1) (X⁻=[TFSI]⁻) can be obtained by, for example, the following production method.

First, poly(diallyldimethyl ammonium)chloride ([P(DADMA)][Cl]) is dissolved in deionized water and stirred to prepare a [P(DADMA)][Cl] aqueous solution. As [P(DADMA)][Cl], for example, a commercially available product can be uses as it is. Then, Li[TFSI] is separately dissolved in deionized water to prepare an aqueous solution comprising Li[TFSI].

Thereafter, the two aqueous solutions are mixed such that the molar ratio of Li[TFSI] to [P(DADMA)][Cl] (molar number of Li[TFSI]/molar number of [P(DADMA)][Cl]) falls within 1.2 to 2.0 and stirred for 2 to 8 hours to precipitate solid out, and the resulting solid is collected by filtration. By washing the solid using deionized water and drying the solid under vacuum for 12 to 48 hours, it is possible to obtain a polymer having a structural unit represented by the formula (1) ([P(DADMA)][TFSI]).

The content of the polymer having a structural unit represented by the formula (1) is not particularly limited and is preferably 10% by mass or more, more preferably 20% by mass or more, still more preferably 30% by mass or more based on the total amount of the composition. The content of the polymer is also preferably 80% by mass or less, more preferably 70% by mass or less, still more preferably 60% by mass or less based on the total amount of the composition. When the content of the polymer is 10% by mass or more, the strength of the polymer electrolyte sheet tends to be further increased. Additionally, by setting the content of the polymer to 80% by mass or less and increasing the amount of other components (electrolyte salt, molten salt, and the like), it is possible to further increase the ionic conductivity of the polymer electrolyte sheet.

[Electrolyte Salt]

The polymer electrolyte composition comprises at least one electrolyte salt selected from the group consisting of lithium salts, sodium salts, magnesium salts, and calcium salts.

As the electrolyte salt, ones used as an electrolyte salt for liquid electrolytes for common ion batteries can be used. The anion of the electrolyte salt may be a halide ion (I⁻, Cl⁻, Br⁻, or the like), SCN⁻, $BF_4^-$, $BF_3(CF_3)^-$, $BF_3(C_2F_5)^-$, $BF_3(C_3F_7)^-$, $BF_3(C_4F_9)^-$, $PF_6^-$, $ClO_4^-$, $SbF_6^-$, [FSI]⁻, [TFSI]⁻, $N(C_2FSO_2)_2^-$, $BPh_4^-$, $B(C_2H_4O_2)_2^-$, [f3C]⁻, $C(CF_3SO_2)_3^-$, $CF_3COO^-$, $CF_3SO_2O^-$, $C_6FSO_2O^-$, [BOB]⁻, RCOO⁻ (R is an alkyl group having 1 to 4 carbon atoms, a phenyl group, or a naphthyl group), or the like. Of these, the anion of the electrolyte salt is preferably at least one selected from the group consisting of $PF_6^-$, $BF_4^-$, [FSI]⁻, [TFSI]⁻, [BOB]⁻, and $ClO_4^-$, more preferably [TFSI]⁻ or [FSI]⁻.

The lithium salt may be $LiPF_6$, $LiBF_4$, Li[FSI], Li[TFSI], Li[f3C], Li[BOB], $LiCO_4$, $LiBF_3(CF_3)$, $LiBF_3(C_2F)$, $LiBF_3(C_3F_7)$, $LiBF_3(C_4F_9)$, $LiC(SO_2CF_3)_3$, $LiCF_3SO_2O$, $LiCF_3COO$, LiRCOO (R is an alkyl group having 1 to 4 carbon atoms, a phenyl group, or a naphthyl group), or the like. These may be used singly or two or more of these may be used in combination.

The sodium salt may be $NaPF_6$, $NaBF_4$, Na[FSI], Na[TFSI], Na[f3C], Na[BOB], $NaCO_4$, $NaBF_3(CF_3)$, $NaBF_3(C_2F)$, $NaBF_3(C_3F_7)$, $NaBF_3(C_4F_9)$, $NaC(SO_2CF_3)_3$, $NaCF_3SO_2O$, $NaCF_3COO$, NaRCOO (R is an alkyl group having 1 to 4 carbon atoms, a phenyl group, or a naphthyl group), or the like. These may be used singly or two or more of these may be used in combination.

The magnesium salt may be $Mg(PF_6)_2$, $Mg(BF_4)_2$, $Mg[FSI]_2$, $Mg[TFSI]_2$, $Mg[f3C]_2$, $Mg[BOB]_2$, $Mg(ClO_4)_2$, $Mg[BF_3(CF_3)_3]_2$, $Mg[BF_3(C_2F_5)]_2$, $Mg[BF_3(C_3F_7)]_2$, $Mg[BF_3(C_4F_9)]_2$, $Mg[C(SO_2CF_3)_3]_2$, $Mg(CF_3SO_2O)_2$, $Mg(CF_3COO)_2$, $Mg(RCOO)_2$ (R is an alkyl group having 1 to 4 carbon atoms, a phenyl group, or a naphthyl group), or the like. These may be used singly or two or more of these may be used in combination.

The calcium salt may be $Ca(PF_6)_2$, $Ca(BF_4)_2$, $Ca[FSI]_2$, $Ca[TFSI]_2$, $Ca[f3C]_2$, $Ca[BOB]_2$, $Ca(ClO_4)_2$, $Ca[BF_3(CF_3)_3]_2$, $Ca[BF_3(C_2F_5)]_2$, $Ca[BF_3(C_3F_7)]_2$, $Ca[BF_3(C_4F_9)]_2$, $Ca[C(SO_2CF_3)_3]_2$, $Ca(CF_3SO_2O)_2$, $Ca(CF_3COO)_2$, $Ca(RCOO)_2$ (R is an alkyl group having 1 to 4 carbon atoms, a phenyl group, or a naphthyl group) or the like. These may be used singly or two or more of these may be used in combination.

Of these, the electrolyte is preferably a lithium salt, more preferably, at least one selected from the group consisting of $LiPF_6$, $LiBF_4$, Li[FSI], Li[TFSI], Li[f3C], Li[BOB], and $LiClO_4$, still more preferably Li[TFSI] or Li[FSI] from the viewpoint of dissociation ability and electrochemical stability.

The mass ratio of the electrolyte salt to the polymer having a structural unit represented by the formula (1) (mass of the electrolyte salt/mass of the polymer having a structural unit represented by the formula (1)) is not particularly limited, and is preferably 0.1 or more, more preferably 0.2 or more, still more preferably 0.3 or more. The mass ratio is also preferably 1.0 or less, more preferably 0.9 or less, still more preferably 0.8 or less. When the mass ratio of the electrolyte salt is 0.1 or more, the ion carrier concentration of the polymer electrolyte sheet becomes sufficient and the ionic conductivity tends to further increase. When the mass ratio of the electrolyte salt is 1.0 or less, the mechanical strength of the polymer electrolyte sheet tends to be more excellent.

The content of the electrolyte salt is not particularly limited, and is preferably 3% by mass or more, more preferably 5% by mass or more, still more preferably 7% by mass or more based on the total amount of the composition. The content of the electrolyte salt is preferably 30% by mass or less, more preferably 25% by mass or less, still more preferably 20% by mass or less based on the total amount of the composition. When the content of the electrolyte salt is 3% by mass or more, the ionic conductivity tends to further increase. When the content of the electrolyte salt is 30% by mass or less, the flexibility of the polymer electrolyte sheet tends to be further increased.

[Molten Salt]

The polymer electrolyte composition comprises a molten salt having a melting point of 250° C. or less.

A molten salt is composed of a cationic component and an anionic component. As the molten salt, a common ionic liquid or plastic crystal, as long as the melting point thereof is 250° C. or less, can be used without particular limitation.

It should be noted that, in the present description, an "ionic liquid" means a molten salt that is liquid at 30° C., that is, a molten salt of which a melting point is 30° C. or less, and a "plastic crystal" means a molten salt that is solid at 30° C., that is, a molten salt of which a melting point is higher than 30° C.

The ionic liquid, if it is a molten salt that is liquid at 30° C., can be used without particular limitation. Specifically, examples thereof include ionic liquids that are obtained by combining a cationic component such as $[EMI]^+$, $[DEME]^+$, $[Py12]^+$, $[Py13]^+$, or $[PP13]^+$ and an anionic component such as $PF_6^-$, $BF_4^-$, $[FSI]^-$, $[TFSI]^-$, or $[f3C]^-$, the ionic liquids being liquid at 30° C. These may be used singly or two or more of these may be used in combination. Also, the ionic liquid may be used in combination with a plastic crystal mentioned below. The ionic liquid is, from the viewpoint of ionic conductivity, preferably [EMI][TFSI] (melting point: −15° C.) or [DEME][TFSI] (melting point: −83° C.).

The melting point of the ionic liquid is not particularly limited, but is preferably 25° C. or less, more preferably 10° C. or less, still more preferably 0° C. or less. When the melting point is 25° C. or less, the ionic conductivity tends to be unlikely to decrease even at room temperature (e.g., 25° C.) or less. The lower limit of the melting point of the ionic liquid is not particularly limited, but may be −150° C. or more, −120° C. or more, or −90° C. or more.

A plastic crystal, if it is a molten salt that is solid at 30° C. and of which a melting point is 250° C. or less, can be used without particular limitation. Specifically, examples thereof include plastic crystals that are obtained by combining a cationic component such as $[EMI]^+$, $[DEME]^+$, $[Py12]^+$, $[Py13]^+$, or $[PP13]^+$ and an anionic component such as $PF_6^-$, $BF_4^-$, $[FSI]^-$, $[TFSI]^-$, or $[f3C]^-$, the plastic crystals being solid at 30° C. More specifically, examples thereof include [Py12][TFSI](melting point: 90° C.), [Py12][FSI] (melting point: 205° C.), [DEME][f3C] (melting point: 69° C.), [Py13][f3C] (melting point: 177° C.), and [PP13][f3C] (melting point: 146° C.). These may be used singly or two or more of these may be used in combination. Also, the plastic crystal may be used in combination with the ionic liquid mentioned above. When the melting point is 80° C. or more, the plastic crystal tends to further suppress liquid leakage during normal battery use. Accordingly, a battery having a bipolar electrode in which electrodes are layered in series in a single cell can be achieved by use of the plastic crystal. The plastic crystal is, from the viewpoint of ionic conductivity, preferably [Py12][TFSI] (melting point: 90° C.).

The melting point of the plastic crystal is 250° C. or less, preferably 200° C. or less, more preferably 150° C. or less, still more preferably 100° C. or less. When the melting point is 250° C. or less, the ionic conductivity tends to increase. The lower limit of the melting point of the molten salt is not particularly limited, but can be 80° C. or more, for example.

The content of the molten salt is preferably 10 to 70% by mass based on the total amount of the composition. The content of the molten salt is more preferably 20% by mass or more, still more preferably 30% by mass or more based on the total amount of the composition. Also, the content of the molten salt is more preferably 65% by mass or less, still more preferably 55% by mass or less based on the total amount of the composition. When the content of the molten salt is 10% by mass or more, the ionic conductivity of the polymer electrolyte sheet tends to further increase. When the content of the molten salt is 70% by mass or less, the self-supportability of the polymer electrolyte sheet tends to be more excellent.

[Other Components]

The polymer electrolyte composition may further comprise particles or fiber of an oxide such as silica and alumina, an inorganic solid electrolyte such as $Li_7La_3Zr_2O_{12}$ (LLZ), an additive having a lithium-salt dissociation ability such as borate ester and aluminate ester and the like, as required. These can be used singly or two or more of these can be used in combination. In the case where these components are further comprised in the polymer electrolyte composition, the content of these components may be 0.01 to 20% by mass based on the total amount of the composition.

The polymer electrolyte composition may be formed into a sheet form.

The thickness of the polymer electrolyte sheet may be adjusted to a desired thickness in accordance with the configuration of the battery. The thickness of the polymer electrolyte sheet is preferably 1 μm or more, more preferably 3 μm or more, still more preferably 5 μm or more. The thickness of the polymer electrolyte sheet is also preferably 200 μm or less, more preferably 100 μm or less, still more preferably 70 μm or less. When the thickness is 1 μm or more, a short circuit between electrodes tends to be further reduced. When the thickness is 200 μm or less, the energy density tends to be further increased.

Subsequently, a method for producing the polymer secondary battery 1 aforementioned will be described. The method for producing the polymer secondary battery 1 according to the present embodiment comprises a first step of forming the positive electrode mixture layer 10 on the positive electrode current collector 9 to obtain the positive electrode 6, a second step of forming the negative electrode mixture layer 12 on the negative electrode current collector 11 to obtain the negative electrode 8, and a third step of providing the electrolyte layer 7 between the positive electrode 6 and the negative electrode 8.

In the first step, the positive electrode 6 is obtained by, for example, dispersing materials used for the positive electrode mixture layer in a dispersion medium using a kneading machine, a disperser or the like to obtain a slurried positive electrode mixture, then applying this positive electrode mixture by a doctor blade method, a dipping method, a spray method or the like on the positive electrode current collector 9, and then vaporizing the dispersion medium. After the dispersion medium is vaporized, a compression molding step by a roll press may be provided as required. The positive electrode mixture layer 10 may be formed as a positive electrode mixture layer of a multi-layer structure by performing the aforementioned steps from application of the positive electrode mixture to vaporization of the dispersion medium a plurality of times.

The dispersion medium used in the first step may be water, 1-methyl-2-pyrrolidone (hereinbelow, also referred to as NMP) or the like.

In the second step, the method for forming the negative electrode mixture layer 12 on the negative electrode current collector 11 may be a method similar to the first step aforementioned.

In the third step, in one embodiment, the electrolyte layer 7 is formed by producing a polymer electrolyte sheet comprising the aforementioned polymer electrolyte composition on a substrate, for example. FIG. 4(a) is a schematic cross sectional view showing a polymer electrolyte sheet according to one embodiment. As shown in FIG. 4(a), the polymer electrolyte sheet 13A comprises a substrate 14 and an electrolyte layer 7 provided on the substrate 14.

The polymer electrolyte sheet 13A is produced by, for example, dispersing a polymer electrolyte composition used for the electrolyte layer 7 in a dispersion medium to obtain a slurry, then applying the slurry on the substrate 14, and then vaporizing the dispersion medium. The dispersion medium into which the polymer electrolyte composition used for the electrolyte layer 7 is dispersed may be acetone, ethyl methyl ketone, γ-butyrolactone or the like, for example.

The substrate 14 is one having heat resistance that may tolerate heating when the dispersion medium is vaporized, is not limited as long as the substrate does not react with the polymer electrolyte composition, and is not swelled with the polymer electrolyte composition, and examples of the substrate include metal foils, and films composed of a resin. The substrate 14 may be specifically a metal foil such as an aluminum foil, a copper foil, or a nickel foil, a film composed of a resin such as polyethylene terephthalate, polytetrafluoroethylene, polyimide, polyethersulfone, or polyetherketone (general-purpose engineering plastic) or the like.

In the case where a film composed of a resin is used as the substrate 14, the heat resistant temperature of the substrate 14 is preferably 50° C. or more, more preferably 100° C. or more, still more preferably 150° C. or more, and may be for example, 400° C. or less, from the viewpoint of adaptability with the dispersion medium used for the electrolyte layer 7. When a substrate having the above-described heat resistant temperature is used, it is possible to suitably use the dispersion medium as aforementioned. It should be noted that the heat resistant temperature of the substrate 14 in the case where a film composed of a resin is used represents the melting point or decomposition temperature of the resin.

It is preferred that the thickness of the substrate 14 be is as small as possible while the strength to tolerate the tensile strength in an applicator is maintained. The thickness of the substrate 14 is preferably 5 µm or more, more preferably 10 µm or more, still more preferably 25 µm or more and preferably 100 µm or less, more preferably 50 µm or less, still more preferably 40 µm or less from the viewpoint of reducing the total volume of the polymer electrolyte sheet 13 as well as of retaining the strength when the polymer electrolyte composition is applied to the substrate 14.

It is possible to produce a polymer electrolyte sheet continuously while winding the sheet into a roll form. In this case, the surface of the electrolyte layer 7 comes in contact with the back surface of the substrate 14, a portion of the electrolyte layer 7 sticks to the substrate 14, and thus the electrolyte layer 7 may be broken. In order to prevent such a situation, the polymer electrolyte sheet, as another embodiment, may be one in which a protective material is provided on the side of the electrolyte layer 7 opposite to the substrate 14. FIG. 4(b) is a schematic cross sectional view showing a polymer electrolyte sheet according to another embodiment. As shown in FIG. 4(b), the polymer electrolyte sheet 13B is further provided with a protective material 15 on the side of the electrolyte layer 7 opposite to the substrate 14.

The protective material 15 may be one that is easily peelable from the electrolyte layer 7, and is preferably an apolar resin film such as polyethylene, polypropylene, polytetrafluoroethylene and the like. When an apolar resin film is used, the electrolyte layer 7 and the protective material 15 do not stick to each other, and it is possible to easily peel the protective material 15 off.

The thickness of the protective material 15 is preferably 5 µm or more, more preferably 10 µm or more and preferably 100 µm or less, more preferably 50 µm or less, still more preferably 30 µm or less from the viewpoint of reducing the total volume of the polymer electrolyte sheet 13B as well as of retaining the strength.

The heat resistant temperature of the protective material 15 is preferably −30° C. or more, more preferably 0° C. or more and preferably 100° C. or less, more preferably 50° C. or less from the viewpoint of suppressing deterioration under low-temperature environments as well as suppressing softening under high-temperature environments. When the protective material 15 is provided, vaporizing the dispersion medium aforementioned is not essential, and thus it is not necessary to making the heat resistant temperature higher.

In the method in which the electrolyte layer 7 is provided between the positive electrode 6 and the negative electrode 8 by using the polymer electrolyte sheet 13A, it is possible to obtain the polymer secondary battery 1 by, for example, peeling the substrate 14 from the polymer electrolyte sheet 13A and layering the positive electrode 6, the electrolyte layer 7, and the negative electrode 8 via lamination. In this time, lamination is carried out such that the electrolyte layer 7 is positioned on the side of the positive electrode mixture layer 10 of the positive electrode 6 and on the side of the negative electrode mixture layer 12 of the negative electrode 8, that is, such that the positive electrode current collector 9, the positive electrode mixture layer 10, the electrolyte layer 7, the negative electrode mixture layer 12, and the negative electrode current collector 11 are placed in this order.

In the third step, in another embodiment, the electrolyte layer 7 is formed by application on at least either one of the side of the positive electrode mixture layer 10 of the positive electrode 6 or the side of the negative electrode mixture layer 12 of the negative electrode 8, and is formed by application on preferably both of the side of the positive electrode mixture layer 10 of the positive electrode 6 and the side of the negative electrode mixture layer 12 of the negative electrode 8. In this case, it is possible to obtain the polymer secondary battery 1 by, for example, layering the positive electrode 6 on which the electrolyte layer 7 is provided and the negative electrode 8 on which the electrolyte layer 7 is provided via lamination such that the electrolyte layers 7 are brought in contact to each other.

The method for forming the electrolyte layer 7 on the positive electrode mixture layer 10 by application is, for example, a method in which the polymer electrolyte composition used for the electrolyte layer 7 is dispersed in a dispersion medium to obtain a slurry and then the polymer electrolyte composition is applied on the positive electrode mixture layer 10 using an applicator. The dispersion medium into which the polymer electrolyte composition used for the electrolyte layer 7 is dispersed may be acetone, ethyl methyl ketone, and γ-butyrolactone, or the like.

The method for forming the electrolyte layer 7 on the negative electrode mixture layer 12 by application may be a method similar to the method for forming the electrolyte layer 7 on the positive electrode mixture layer 10 by application.

Second Embodiment

Figure 5:
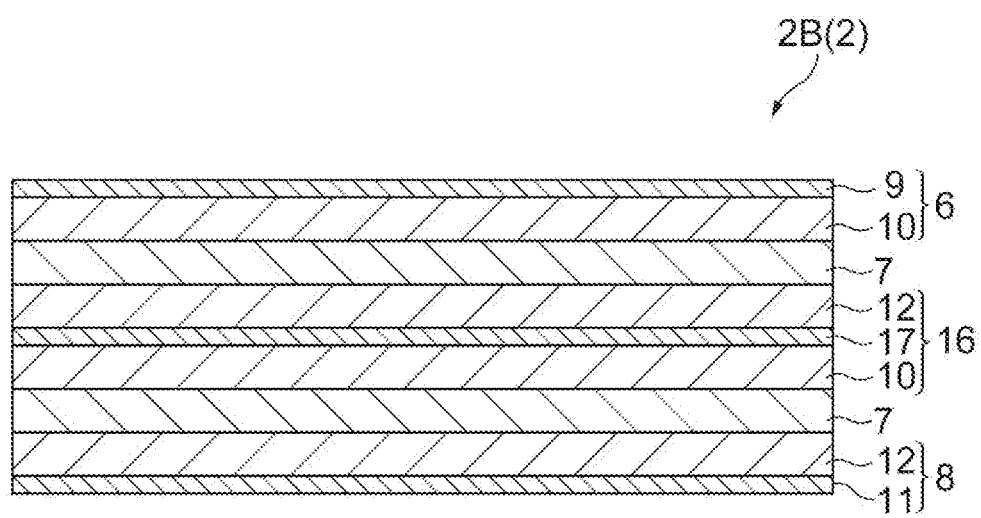
FIG. 5 is a schematic cross sectional view showing one embodiment of an electrode group in the polymer secondary battery according to Second Embodiment.

Subsequently, a polymer secondary battery according to Second Embodiment will be described. FIG. 5 is a schematic cross sectional view showing one embodiment of an electrode group in the polymer secondary battery according to Second Embodiment. As shown in FIG. 5, the point where polymer secondary battery in Second Embodiment is different from the polymer secondary battery of First Embodiment is that an electrode group 2B comprises a bipolar electrode 16. That is, the electrode group 2B comprises a positive electrode 6, a first electrolyte layer 7, a bipolar electrode 16, a second electrolyte layer 7, and a negative electrode 8 in this order.

The bipolar electrode 16 comprises a bipolar electrode current collector 17, a positive electrode mixture layer 10 provided on the surface of the side of the negative electrode 8 of the bipolar electrode current collector 17, and a negative electrode mixture layer 12 on the surface of the side of the positive electrode 6 of the bipolar electrode current collector 17.

The bipolar electrode current collector 17 may be formed with aluminum, stainless steel, titanium or the like. The bipolar electrode current collector 17 may be specifically an aluminum perforated foil having pores of which pore diameter is 0.1 to 10 mm, an expanded metal, a foamed metal sheet or the like. The bipolar electrode current collector 17 may be formed with any material other than those described above as long as the material is not subject to change such as dissolution and oxidation during use of the battery, and additionally, its shape and production method are not limited.

The thickness of the bipolar electrode current collector 17 may be 10 μm or more, 15 μm or more, or 20 μm or more. The thickness of the bipolar electrode current collector 17 may be 100 μm or less, 80 μm or less, or 60 μm or less.

Subsequently, a method for producing the secondary battery according to Second Embodiment will be described. The method for producing the secondary battery according to the present embodiment comprises a first step of forming the positive electrode mixture layer 10 on the positive electrode current collector 9 to obtain the positive electrode 6, a second step of forming the negative electrode mixture layer 12 on the negative electrode current collector 11 to obtain the negative electrode 8, a third step of forming the positive electrode mixture layer 10 on one surface of the bipolar electrode current collector 17 and forming the negative electrode mixture layer 12 on the other surface to obtain the bipolar electrode 16, and a fourth step of forming the electrolyte layer 7 each between the positive electrode 6 and the bipolar electrode 16 and between the negative electrode 8 and the bipolar electrode 16.

The first step and the second step may be a method similar to the first step and the second step in First Embodiment.

In the third step, the method forming the positive electrode mixture layer 10 on one surface of the bipolar electrode current collector 17 may be a method similar to the first step in First Embodiment. The method forming the negative electrode mixture layer 12 on the other surface of the bipolar electrode current collector 17 may be a method similar to the second step in First Embodiment.

Of the fourth step, as the method for providing the electrolyte layer 7 between the positive electrode 6 and the bipolar electrode 16, in one embodiment, the electrolyte layer 7 is formed, for example, by producing a polymer electrolyte sheet comprising the polymer electrolyte composition on a substrate. The method for producing the polymer electrolyte sheet may be a method similar to the method for producing the polymer electrolyte sheets 13A and 13B in First Embodiment.

In the fourth step, the method for providing the electrolyte layer 7 between the negative electrode 8 and the bipolar electrode 16 may a method similar to the method for providing electrolyte layer 7 between the positive electrode 6 and the bipolar electrode 16 aforementioned.

The method for forming the electrolyte layer 7 by application each on the positive electrode mixture layer 10 of the positive electrode 6 and on the negative electrode mixture layer 12 of the bipolar electrode 16 may be a similar method to the method for forming the electrolyte layer 7 by application on the positive electrode mixture layer 10 and the method for forming the electrolyte layer 7 by application on the negative electrode mixture layer 12 according to one embodiment of the third step in First Embodiment.

Of the fourth step, as the method for providing the electrolyte layer 7 between the positive electrode 6 and the bipolar electrode 16, in another embodiment, the electrolyte layer 7 is formed by application on at least either one of the side of the positive electrode mixture layer 10 of the positive electrode 6 or the side the negative electrode mixture layer 12 of the bipolar electrode 16, and is formed by application preferably both of the side of the positive electrode mixture layer 10 of the positive electrode 6 and the side of the negative electrode mixture layer 12 of the bipolar electrode 16. In this case, for example, the positive electrode 6 on which the electrolyte layer 7 is provided and the bipolar electrode 16 on which the electrolyte layer 7 is provided are layered via lamination such that the electrolyte layers 7 are brought in contact to each other.

EXAMPLES

Hereinbelow, the invention will be described more specifically according to Examples, but the present invention is not intended to be limited to these Examples.

[Polymer Synthesis]

A polymer having a structural unit represented by the formula (1) was synthesized by converting the counter anion $Cl^-$ of poly(diallyldimethyl ammonium)chloride to $[TFSI]^-$.

First, diluted was 100 parts by mass of a [P(DADMA)][Cl] aqueous solution (20% by mass aqueous solution, manufactured by Sigma-Aldrich Co. LLC.) with 500 parts by mass of distilled water to prepare a diluted polymer aqueous solution. Then, 43 parts by mass of Li[TFSI] (manufactured by KISHIDA CHEMICAL Co., Ltd.) was dissolved in 100 parts by mass of water to prepare a Li[TFSI] aqueous solution. This was added dropwise to the diluted polymer aqueous solution, and a white precipitate was obtained by stirring for two hours. The precipitate was separated by filtration, and after washing with 400 parts by mass of distilled water, filtration was conducted again. Washing and filtration were repeated five times. Thereafter, moisture was evaporated by vacuum drying at 105° C. to obtain [P(DADMA)][TFSI]. The viscosity average molecular weight of [P(DADMA)][TFSI] was $2.11 \times 10^6$ g·mol$^{-1}$.

After the viscosity of the polymer [η] at 25° C. was measured by using poly(methyl methacrylate) (PMMA) as the reference material and using an Ubbelohde viscometer, the viscosity average molecular weight Mv was calculated based on [η]=KMv (wherein K represents an extension factor, and the value depends on the temperature, the polymer, and the nature of the solvent).

Example 1

[Preparation of Polymer Electrolyte Sheet]

As shown in Table 1, to 8 parts by mass of the polymer obtained, 2 parts by mass of Li[TFSI] as an electrolyte salt, 10 parts by mass of [Py12][TFSI] (manufactured by KANTO CHEMICAL CO., INC., melting point: 90° C.) as a molten salt (the content of the molten salt in the composition: 50% by mass), and 16 parts by mass of acetone as a dispersion medium were added and stirred to prepare a slurry. The slurry was applied on an aluminum foil with a gap of 100 μm by the doctor blade method and dried at 40° C. for two hours to vaporize acetone. Thereafter, drying was carried out at 60° C. under a reduced pressure of $1.0 \times 10^4$ Pa or less (0.1 atmospheres or less) for 10 hours to obtain a polymer electrolyte sheet of which thickness is 28 μm.

[Measurement of Residual Mass Ratio]

Changes in the mass of the polymer electrolyte sheet before and after drying under reduced pressure ($1.0 \times 10^4$ Pa or less (0.1 atmospheres or less)) at 60° C. were determined to calculate the residual mass ratio of the polymer electrolyte sheet. The residual mass ratio was calculated based on the following formula. The results are shown in Table 2.

Residual mass ratio [% by mass]=[Mass of the polymer electrolyte composition after drying [g]/ (Mass of the polymer electrolyte composition before drying [g]-Mass of the volatile component (dispersion medium) comprised in the polymer electrolyte composition before drying [g])]×100

There is a possibility that the volatile component such as acetone and water remains in the polymer electrolyte composition before drying, and thus, in the above-described measurement, the residual mass ratio was determined based on the value obtained by subtracting the mass of the volatile component such as acetone and water remaining in the polymer from the mass of the polymer electrolyte composition before drying. Drying under reduced pressure at 60° C. was conducted on a polymer electrolyte composition prepared in the same manner as in Example 1 except that a molten salt was not used, and the above-described "mass of the volatile component (dispersion medium) comprised in the polymer electrolyte composition before drying" was determined from the mass changes before and after the drying.

[Evaluation of Ability of Forming Self-Supporting Sheet]

The polymer electrolyte sheet formed on an aluminum foil obtained in Example 1 was peeled off from the aluminum foil to verify the self-supportability of the polymer electrolyte sheet. For the evaluation, polymer electrolyte sheets formed on a 20-cm square aluminum foil were used. Polymer electrolyte sheets that was able to be peeled off in a size larger than a 10-cm square were evaluated as A, those able to be peeled off in a size from a 5-cm square to a 10-cm square as B, and those able to be peeled off in a size less than a 5-cm square as C. The results are shown in Table 2.

[Measurement of Ionic Conductivity]

The polymer electrolyte sheet obtained in Example 1 was sandwiched between aluminum foils and punched to a diameter of 16 mm to prepare a sample for ionic conductivity measurement. This sample was placed in a bipolar closed cell (HS cell, manufactured by Hohsen Corp.) and measured using an alternating current impedance measuring device (1260 type, manufactured by Solartron Analytical). The temperature was adjusted at a 15° C. interval from −5° C. to 70° C. in a thermostatic chamber, and the alternating current impedance was measured at 10 mV in the range of 1 Hz to 2 MHz. The resistance value was calculated from the intersection with the real axis of the Nyquist plot, and the ionic conductivity was calculated from the resistance value. The results of the ionic conductivity at 25° C. or 55° C. are shown in Table 2. It should be noted that placement of a sample in the closed cell was carried out in a glove box under an argon atmosphere.

[Production of Battery]

Mixed were 90 parts by mass of LiFePO$_4$ (positive electrode active material), 5 parts by mass of acetylene black (conductive agent, trade name: HS-100, average particle size 48 nm (manufacturer catalog value), Denka Company Limited), 100 parts by mass of a polyvinylidene fluoride solution (binder, trade name: Kureha KF Polymer #7305, solid content 5% by mass, KUREHA CORPORATION), and 28 parts by mass of N-methyl-2-pyrrolidone (NMP) to prepare a positive electrode mixture paste. This positive electrode mixture paste was applied on both surfaces of the positive electrode current collector (an aluminum foil of which thickness is 20 μm), dried at 120° C., and then rolled to form a positive electrode active material layer of which thickness of one surface was 91 μm, of which amount of applied on one surface was 50 g/m$^2$, and of which the mixture density was 1.8 g/cm$^3$, and a positive electrode was produced. As the positive electrode, a sample punched out to a diameter of 15 mm was provided for producing a coin-type battery for test.

As the negative electrode, a lithium foil punched out to a diameter of 16 mm was provided. The positive electrode, the polymer electrolyte sheet, and the lithium foil were layered in this order and placed in a CR2032-type coin cell case. In this time, the lithium foil serves as the negative electrode active material, and the stainless steel of the coin cell case serves as the negative electrode current collector. A lithium polymer secondary battery was obtained by crimp-sealing the top of the battery case via an insulating gasket.

[Evaluation of Battery Performance]

The lithium polymer secondary battery produced by the above-described method was used to evaluate battery performance. A charge and discharge device (TOYO SYSTEM CO., LTD., trade name: TOSCAT-3200) was used to conduct charge and discharge measurement at 25° C. or 55° C. and 0.05 C, and the available/design capacity ratio using the discharge capacity of the third cycle was calculated based on the following equation. The results are shown in Table 2. It should be noted that C means "Current value [A]/designed theoretical capacity [Ah]" and 1 C represents a current value in full charge or full discharge of the battery in an hour.

Available/design capacity ratio[%]=(Discharge capacity [mAh]/Battery design capacity [mAh])×100

Example 2

A polymer electrolyte sheet was produced in the same manner as in Example 1 except that the content of the molten salt was changed from 10 parts by mass to 4.3 parts by mass (the content of the molten salt in the composition: 30% by mass), and evaluation was conducted as in Example 1. The results are shown in Table 2.

Example 3

A polymer electrolyte sheet was produced in the same manner as in Example 1 except that the content of the molten salt was changed from 10 parts by mass to 2.5 parts by mass (the content of the molten salt in the composition: 20% by mass), and evaluation was conducted as in Example 1. The results are shown in Table 2.

Example 4

A polymer electrolyte sheet was produced in the same manner as in Example 1 except that the content of the molten salt was changed from 10 parts by mass to 1.1 parts by mass (the content of the molten salt in the composition: 10% by mass), and evaluation was conducted as in Example 1. The results are shown in Table 2.

Example 5

A polymer electrolyte sheet was produced in the same manner as in Example 1 except that the molten salt was changed from [Py12][TFSI] to [EMI][TFSI] (manufactured by KANTO CHEMICAL CO., INC., melting point: −15° C.), and evaluation was conducted as in Example 1. The results are shown in Table 2.

Example 6

A polymer electrolyte sheet was produced in the same manner as in Example 2 except that the molten salt was changed from [Py12][TFSI] to [EMI][TFSI], and evaluation was conducted as in Example 1. The results are shown in Table 2.

Example 7

A polymer electrolyte sheet was produced in the same manner as in Example 3 except that the molten salt was changed from [Py12][TFSI] to [EMI][TFSI], and evaluation was conducted as in Example 1. The results are shown in Table 2.

Example 8

A polymer electrolyte sheet was produced in the same manner as in Example 4 except that the molten salt was changed from [Py12][TFSI] to [EMI][TFSI], and evaluation was conducted as in Example 1. The results are shown in Table 2.

Example 9

A polymer electrolyte sheet was produced in the same manner as in Example 1 except that the molten salt was changed from [Py12][TFSI] to [DEME][TFSI] (manufactured by KANTO CHEMICAL CO., INC., melting point: −83° C.), and evaluation was conducted as in Example 1. The results are shown in Table 2.

Example 10

A polymer electrolyte sheet was produced in the same manner as in Example 2 except that the molten salt was changed from [Py12][TFSI] to [DEME][TFSI], and evaluation was conducted as in Example 1. The results are shown in Table 2.

Example 11

A polymer electrolyte sheet was produced in the same manner as in Example 3 except that the molten salt was changed from [Py12][TFSI] to [DEME][TFSI], and evaluation was conducted as in Example 1. The results are shown in Table 2.

Example 12

A polymer electrolyte sheet was produced in the same manner as in Example 4 except that the molten salt was changed from [Py12][TFSI] to [DEME][TFSI], and evaluation was conducted as in Example 1. The results are shown in Table 2.

Comparative Example 1

A polymer electrolyte sheet was produced in the same manner as in Example 1 except that the molten salt [Py12][TFSI] was replaced with dimethyl carbonate (DMC), an organic solvent, and evaluation was conducted as in Example 1. The results are shown in Table 2.

Comparative Example 2

A polymer electrolyte sheet was produced in the same manner as in Example 1 except that a polymer was not used, and evaluation was conducted as in Example 1. The results are shown in Table 2.

TABLE 1

| Items | Polymer | Electrolyte salt | Molten salt or organic solvent | |
|---|---|---|---|---|
| | | | Type | Content [% by mass] |
| Exam. 1 | [P(DADMA)][TFSI] | Li[TFSI] | [Py12][TFSI] | 50 |
| Exam. 2 | [P(DADMA)][TFSI] | Li[TFSI] | [Py12][TFSI] | 30 |
| Exam. 3 | [P(DADMA)][TFSI] | Li[TFSI] | [Py12][TFSI] | 20 |
| Exam. 4 | [P(DADMA)][TFSI] | Li[TFSI] | [Py12][TFSI] | 10 |
| Exam. 5 | [P(DADMA)][TFSI] | Li[TFSI] | [EMI][TFSI] | 50 |
| Exam. 6 | [P(DADMA)][TFSI] | Li[TFSI] | [EMI][TFSI] | 30 |
| Exam. 7 | [P(DADMA)][TFSI] | Li[TFSI] | [EMI][TFSI] | 20 |
| Exam. 8 | [P(DADMA)][TFSI] | Li[TFSI] | [EMI][TFSI] | 10 |
| Exam. 9 | [P(DADMA)][TFSI] | Li[TFSI] | [DEME][TFSI] | 50 |
| Exam. 10 | [P(DADMA)][TFSI] | Li[TFSI] | [DEME][TFSI] | 30 |
| Exam. 11 | [P(DADMA)][TFSI] | Li[TFSI] | [DEME][TFSI] | 20 |

TABLE 1-continued

| | | | Molten salt or organic solvent | |
|---|---|---|---|---|
| Items | Polymer | Electrolyte salt | Type | Content [% by mass] |
| Exam. 12 | [P(DADMA)][TFSI] | Li[TFSI] | [DEME][TFSI] | 10 |
| Comp. Exam. 1 | [P(DADMA)][TFSI] | Li[TFSI] | DMC | 50 |
| Comp. Exam. 2 | — | Li[TFSI] | [Py12][TFSI] | 83 |

TABLE 2

| Items | Residual mass ratio [%] | Ability of forming a self-supporting sheet |
|---|---|---|
| Exam. 1 | >99 | A |
| Exam. 2 | >99 | A |
| Exam. 3 | >99 | A |
| Exam. 4 | >99 | A |
| Exam. 5 | >99 | B |
| Exam. 6 | >99 | A |
| Exam. 7 | >99 | A |
| Exam. 8 | >99 | A |
| Exam. 9 | >99 | B |
| Exam. 10 | >99 | A |
| Exam. 11 | >99 | A |
| Exam. 12 | >99 | A |
| Comp. Exam. 1 | 51 | A |
| Comp. Exam. 2 | >99 | C |

| | Ionic conductivity [S/cm] | | Available/design capacity ratio [%] | |
|---|---|---|---|---|
| Items | 25° C. | 55° C. | 25° C. | 55° C. |
| Exam. 1 | $4.2 \times 10^{-4}$ | $1.1 \times 10^{-3}$ | 95 | 99 |
| Exam. 2 | $4.0 \times 10^{-5}$ | $1.6 \times 10^{-4}$ | 90 | 90 |
| Exam. 3 | $8.5 \times 10^{-6}$ | $4.5 \times 10^{-5}$ | 75 | 92 |
| Exam. 4 | $1.1 \times 10^{-6}$ | $1.2 \times 10^{-5}$ | 57 | 85 |
| Exam. 5 | $1.5 \times 10^{-3}$ | $4.0 \times 10^{-3}$ | 98 | 99 |
| Exam. 6 | $8.5 \times 10^{-5}$ | $4.3 \times 10^{-4}$ | 92 | 95 |
| Exam. 7 | $7.2 \times 10^{-6}$ | $1.2 \times 10^{-5}$ | 72 | 84 |
| Exam. 8 | $3.1 \times 10^{-7}$ | $6.5 \times 10^{-6}$ | 47 | 70 |
| Exam. 9 | $4.2 \times 10^{-4}$ | $1.8 \times 10^{-3}$ | 94 | 99 |
| Exam. 10 | $2.3 \times 10^{-5}$ | $1.3 \times 10^{-4}$ | 88 | 93 |
| Exam. 11 | $8.6 \times 10^{-6}$ | $7.3 \times 10^{-5}$ | 77 | 90 |
| Exam. 12 | $5.3 \times 10^{-6}$ | $4.9 \times 10^{-5}$ | 68 | 89 |
| Comp. Exam. 1 | $3.0 \times 10^{-8}$ | $8.2 \times 10^{-8}$ | Not measurable | 10 |
| Comp. Exam. 2 | — | — | — | — |

The polymer electrolyte compositions of Examples 1 to 12 comprising a polymer having a structural unit represented by the formula (1) and a molten salt having a melting point of 250° C. or less had an excellent high ionic conductivity even at room temperature and was be able to retain their shape by the sheet itself even without a substrate or the like. It has also found that the polymer electrolyte compositions of Examples 1 to 12 are materials of which thermal stability is high because their mass was hardly reduced when the compositions were dried at 60° C. under a reduced pressure of $1.0 \times 10^4$ Pa or less (0.1 atmospheres or less) for 10 hours. In contrast to this, when the polymer electrolyte composition of Comparative Example 1 using DMC was dried at 60° C. under a reduced pressure of $1.0 \times 10^4$ Pa or less (0.1 atmospheres or less) for 10 hours, the most portion of DMC vaporized and the ionic conductivity was markedly reduced. Alternatively, the polymer electrolyte composition of Comparative Example 2 having no polymer having a structural unit represented by the formula (1) was not sufficient in respect of sheet self-supportability compared with Examples. It should be noted that, in Comparative Example 2, the self-supportability of the sheet was not sufficient and thus measurement of the ionic conductivity and evaluation of the battery performance was not conducted. From these results, it has been confirmed that the polymer electrolyte compositions of the present invention have an excellent high ionic conductivity even at room temperature and it is possible to produce a sheet having a high self-supportability.

INDUSTRIAL APPLICABILITY

According to the present invention, there is provided a polymer electrolyte composition that makes it possible to produce a sheet that has an excellent ionic conductivity at room temperature even without use of an organic solvent and a high self-supportability to retain its shape by the sheet itself even without a substrate or the like. According to the present invention, there is also provided a polymer secondary battery using such a polymer electrolyte composition.

REFERENCE SIGNS LIST

1 . . . polymer secondary battery, 2, 2A, 2B . . . electrode group, 3 . . . battery outer packaging, 4 . . . positive electrode collector tab, 5 . . . negative electrode collector tab, 6 . . . positive electrode, 7 . . . electrolyte layer, 8 . . . negative electrode, 9 . . . positive electrode current collector, 10 . . . positive electrode mixture layer, 11 . . . negative electrode current collector, 12 . . . negative electrode mixture layer, 13A, 13B . . . polymer electrolyte sheet, 14 . . . substrate, 15 . . . protective material, 16 . . . bipolar electrode, 17 . . . bipolar electrode current collector

The invention claimed is:

1. A polymer electrolyte composition comprising:
a polymer having a structural unit represented by the following formula (1):

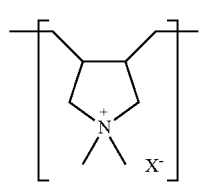

(1)

wherein X represents a counter anion;
at least one electrolyte salt selected from the group consisting of lithium salts, sodium salts, magnesium salts, and calcium salts; and a molten salt having a melting point of 250° C. or less,
wherein the molten salt is at least one selected from the group consisting of 1-ethyl-3-methylimidazolium-bis(trifluoromethanesulfonyl)imide, N,N-diethyl-N-methyl-N-(2-methoxyethyl)ammonium-bis(trifluoromethanesulfonyl)imide, and N-ethyl-N-methylpyrrolidinium-bis(trifluoromethanesulfonyl)imide, and
wherein a content of the molten salt is 30% by mass or more and less than 55% by mass based on the total amount of the composition.

2. The polymer electrolyte composition according to claim 1, wherein the composition is formed in sheet form.

3. The polymer electrolyte composition according to claim 1, wherein the electrolyte salt is a lithium salt.

4. The polymer electrolyte composition according to claim 1, wherein an anion of the electrolyte salt is at least one selected from the group consisting of $PF_6^-$, $BF_4^-$, $N(SO_2)_2^-$, $N(CF_3SO_2)_2^-$, $B(C_2O_4)_2^-$, and $ClO_4^-$.

5. The polymer electrolyte composition according to claim 1, wherein a content of the at least one electrolyte salt is 3% by mass or more and 30% by mass or less.

6. The polymer electrolyte composition according to claim 1, wherein a content of the at least one electrolyte salt is 3% by mass or more and 25% by mass or less.

7. The polymer electrolyte composition according to claim 1, wherein a content of the at least one electrolyte salt is 3% by mass or more and 20% by mass or less.

8. The polymer electrolyte composition according to claim 1, wherein the content of the molten salt is 50% by mass or less based on the total amount of the composition.

9. The polymer electrolyte composition according to claim 1, wherein a content of the polymer having the structural unit represented by the formula (1) is 30% by mass or more and 60% by mass or less based on the total amount of the composition.

10. The polymer electrolyte composition according to claim 1, wherein the polymer having a structural unit represented by the following formula (1) is represented by the following formula (2):

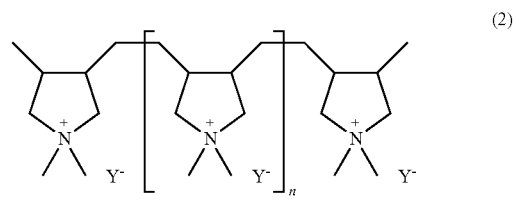

wherein n is 300 to 4000, and Y− represents a counter anion.

11. The polymer electrolyte composition according to claim 10, wherein n is 400 to 3500.

12. The polymer electrolyte composition according to claim 10, wherein n is 500 to 3000.

13. A polymer secondary battery comprising:
a positive electrode;
a negative electrode; and
an electrolyte layer comprising the polymer electrolyte composition according to claim 1 provided between the positive electrode and the negative electrode.

* * * * *